United States Patent
Tripathi et al.

(10) Patent No.: US 11,003,670 B2
(45) Date of Patent: May 11, 2021

(54) METHOD AND SYSTEM FOR IDENTIFYING AT LEAST ONE NASCENT TOPIC RELATED TO A SUBJECT MATTER

(71) Applicant: Innoplexus AG, Eschborn (DE)

(72) Inventors: Gaurav Tripathi, Pune (IN); Vatsal Agarwal, Rampur (IN); Amol Suki, Pune (IN); Akshesh Doshi, Udaipur (IN); Sidhanta Nayak, Dist-Ganjam (IN)

(73) Assignee: Innoplexus AG, Eschborn (DE)

( * ) Notice: Subject to any disclaimer, the term of this patent is extended or adjusted under 35 U.S.C. 154(b) by 103 days.

(21) Appl. No.: 16/233,789

(22) Filed: Dec. 27, 2018

(65) Prior Publication Data

US 2019/0205304 A1    Jul. 4, 2019

(30) Foreign Application Priority Data

Dec. 30, 2017   (GB) ...................................... 1722307

(51) Int. Cl.
```
G06F 16/00      (2019.01)
G06F 16/2457    (2019.01)
G06F 16/9535    (2019.01)
G06F 16/9532    (2019.01)
```
(52) U.S. Cl.
CPC .. G06F 16/24575 (2019.01); G06F 16/24578 (2019.01); G06F 16/9532 (2019.01); G06F 16/9535 (2019.01)

(58) Field of Classification Search
CPC ......... G06F 16/24575; G06F 16/24578; G06F 16/9532; G06F 16/9535

USPC .................................................. 707/705–780
See application file for complete search history.

(56) References Cited

U.S. PATENT DOCUMENTS

| | | | |
|---|---|---|---|
| 10,552,468 B2* | 2/2020 | Ciulla | G06F 16/367 |
| 10,599,953 B2* | 3/2020 | Brown | G06K 9/6263 |
| 2008/0133503 A1* | 6/2008 | Popescul | G06Q 30/0609 |
| 2010/0191742 A1* | 7/2010 | Stefik | G06F 16/35 |
| | | | 707/748 |
| 2010/0228777 A1* | 9/2010 | Imig | G06F 16/335 |
| 2011/0125759 A1* | 5/2011 | Querel | H04L 51/32 |
| | | | 707/748 |
| 2011/0218946 A1* | 9/2011 | Stern | G06N 20/00 |
| | | | 706/12 |
| 2019/0155915 A1* | 5/2019 | Huang | G06F 16/24578 |

(Continued)

*Primary Examiner* — Michelle N Owyang
(74) *Attorney, Agent, or Firm* — Ziegler IP Law Group, LLC

(57) ABSTRACT

Disclosed is a method and a system for identifying nascent topic related to a subject matter. The method comprises receiving a request associated with a context related to subject matter from a user, analyzing the request to determine at least one topic related to the context, determining an activity factor related to each of the context and the topic from at least one data record related therein, normalizing the activity factor related to each of the topic, analyzing the normalized scores of each of the topic to determine a short-term average and a long-term average normalized score for each of the topic and calculating a difference therein, determining a change in the differences over a specific time period, and identifying the topic associated with a sustained increase in the difference over a predefined time duration within the specific time period as the nascent topic related to the subject matter.

20 Claims, 2 Drawing Sheets

(56) References Cited

U.S. PATENT DOCUMENTS

2019/0266288 A1* 8/2019 Shukla ............. G06F 16/24578
2020/0401960 A1* 12/2020 Vangala ................ G06F 3/0483

* cited by examiner

METHOD AND SYSTEM FOR IDENTIFYING AT LEAST ONE NASCENT TOPIC RELATED TO A SUBJECT MATTER

CROSS-REFERENCE TO RELATED APPLICATIONS

This application claims the benefit under 35 U.S.C. § 119(a) and 37 CFR § 1.55 to UK Patent Application No. GB1722307.4, filed on Dec. 30, 2017, the entire content of which is incorporated herein by reference.

TECHNICAL FIELD

The present disclosure generally relates to service industry; and more specifically, to information system. Furthermore, the present disclosure also relates to identifying at least one nascent topic related to a subject matter. Moreover, the present disclosure also relates to computer readable medium containing program instructions for execution on a computer system, which when executed by a computer, cause the computer to perform method steps for identifying at least one nascent topic related to a subject matter.

BACKGROUND

The World Wide Web (Web) is fundamentally a massive databank that contains records of information covering countless topics. With the development of technology, there has been an exponential growth in data connectivity within the online users. Furthermore, with the development of data connectivity, the online users have accelerated distribution of newsworthy and popular topics or events throughout the population of online users. And currently, businesses are being increasingly interested in identifying and acting upon these popular topics or events.

However, identifying these topics or events includes a number of problems. Typically, the distribution of data related to such topics or events throughout the population of online users is done via various online channels, such as online blogs, social media sites, and the likes. Therefore, the aggregation of data related to such popular topics or events is a tedious process and is generated in an unprecedented amount. Usually, extracting knowledge from such aggregated data related to such topics or events is done manually by implementing various statistical measures. Such process of extracting data is inefficient and cumbersome. In recent times few algorithms were generated to extract knowledge from the data related to such popular topics or events, but such algorithm was not capable of identifying topics that were gaining popularity (such as nascent topic) within the topics or events disseminated throughout the population of online users.

Therefore, in light of the foregoing discussion, there exists a need to overcome the aforementioned drawbacks associated with the conventional methods of identifying nascent topic that is gaining popularity.

SUMMARY

The present disclosure seeks to provide a method of identifying at least one nascent topic related to a subject matter. The present disclosure also seeks to provide a system for identifying at least one nascent topic related to a subject matter. The present disclosure seeks to provide a computer readable medium, containing program instructions for execution on a computer system, which when executed by a computer, cause the computer to perform method steps for identifying at least one nascent topic related to a subject matter. The present disclosure seeks to provide a solution to the existing problem of identifying nascent topics that are gaining popularity throughout the population of online users. An aim of the present disclosure is to provide a solution that overcomes at least partially the problems encountered in the prior art and provides an efficient and automated means of acquiring information related to topics that are gaining popularity throughout the population of online users and identifying at least one nascent topic therein.

In first aspect, an embodiment of the present disclosure provides a method of identifying at least one nascent topic related to a subject matter, wherein the method comprises:
a) receiving a request from a user, wherein the request is associated with a context related to the subject matter;
b) analyzing the request to determine at least one topic related to the context;
c) determining an activity factor related to each of the context and the at least one topic from at least one data record related to each of the context and the at least one topic;
d) normalizing the activity factor related to each of the at least one topic based on the activity factor related to the context to obtain a normalized score for each of the at least one topic;
e) analyzing the normalized scores of each of the at least one topic to determine a short-term average and a long-term average normalized score for each of the at least one topic;
f) calculating a difference between the short-term average normalized score and the long-term average normalized score for each of the at least one topic;
g) determining a change in the differences for each of the at least one topic, over a specific time period; and
h) identifying the at least one topic associated with a sustained increase in the difference over a predefined time duration within the specific time period as the at least one nascent topic related to the subject matter.

In second aspect, an embodiment of the present disclosure provides a system for identifying at least one nascent topic related to a subject matter, wherein the system comprises:
a processing module operable to:
receive a request from a user, wherein the request is associated with a context related to the subject matter;
analyze the request to determine at least one topic related to the context;
determine an activity factor related to each of the context and the at least one topic from at least one data record related to each of the context and the at least one topic;
normalize the activity factor related to each of the at least one topic based on the activity factor related to the context to obtain a normalized score for each of the at least one topic;
analyze the normalized score of each of the at least one topic to determine a short-term average and a long-term average normalized score for each of the at least one topic;
calculate a difference between the short-term average normalized score and the long-term average normalized score for each of the at least one topic;
determine a change in the differences for each of the at least one topic, over a specific time period; and
identify the at least one topic associated with a sustained increase in the difference over a predefined time duration within the specific time period as the at least one nascent topic related to the subject matter;

and
a database arrangement communicably coupled to the processing module, wherein the database arrangement is operable to store the identified at least one nascent topic.

In third aspect, an embodiment of the present disclosure provides a computer readable medium, containing program instructions for execution on a computer system, which when executed by a computer, cause the computer to perform method steps for identifying at least one nascent topic related to a subject matter, the method comprising the steps of:
a) receiving a request from a user, wherein the request is associated with a context related to the subject matter;
b) analyzing the request to determine at least one topic related to the context;
c) determining an activity factor related to each of the context and the at least one topic from at least one data record related to each of the context and the at least one topic;
d) normalizing the activity factor related to each of the at least one topic based on the activity factor related to the context to obtain a normalized score for each of the at least one topic;
e) analyzing the normalized score of each of the at least one topic to determine a short-term average and a long-term average normalized score for each of the at least one topic;
f) calculating a difference between the short-term average normalized score and the long-term average normalized score for each of the at least one topic;
g) determining a change in the difference for each of the at least one topic, over a specific time period; and
h) identifying the at least one topic associated with a sustained increase in the difference over a predefined time duration within the specific time period as the at least one nascent topic related to the subject matter.

Embodiments of the present disclosure substantially eliminate or at least partially address the aforementioned problems in the prior art, and enables to identifying nascent topics related to a subject matter.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
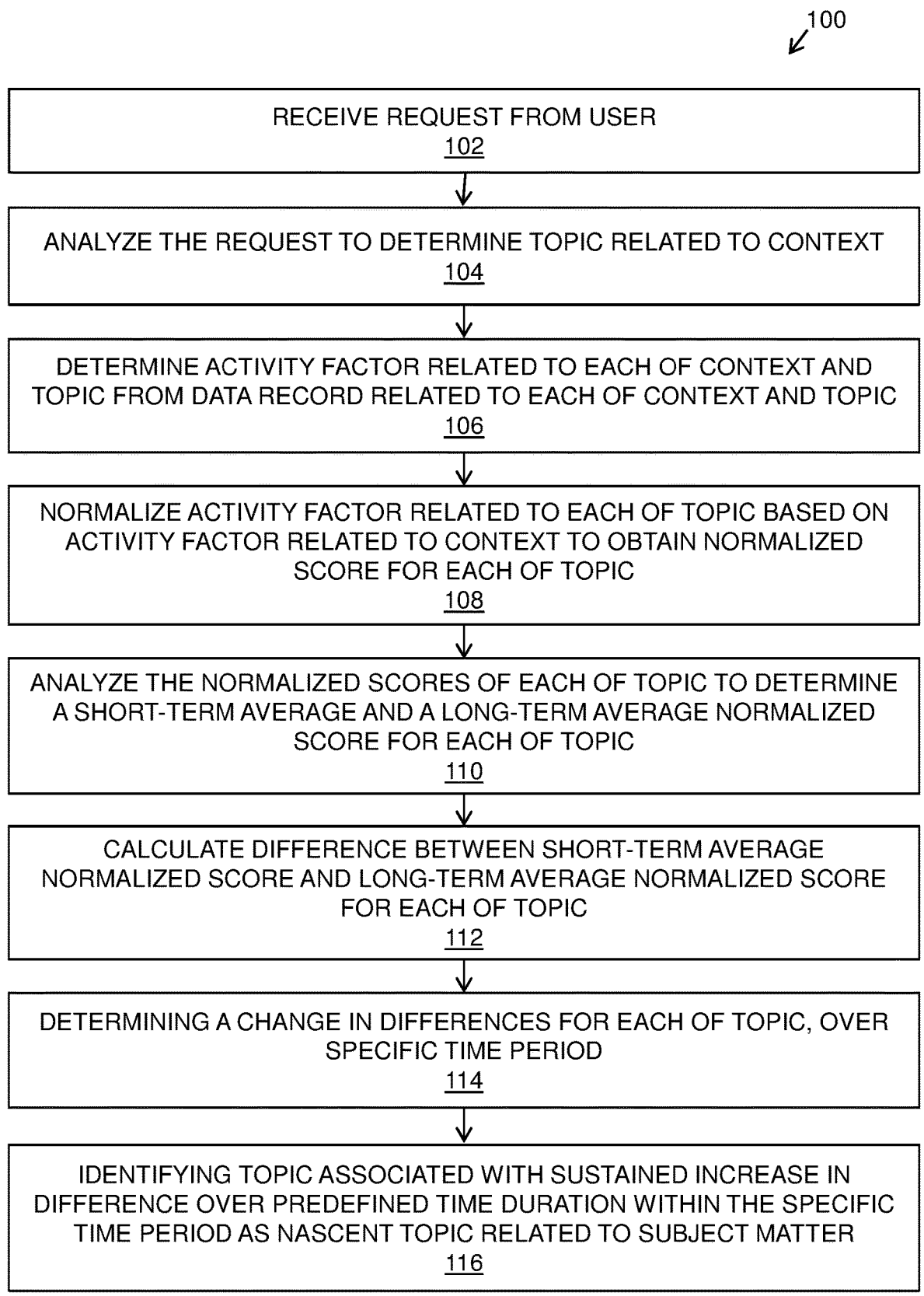
FIG. 1 is an illustration of steps of a method of identifying at least one nascent topic related to a subject matter, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

In overview, embodiments of the present disclosure are concerned with method of identifying at least one nascent topic related to a subject matter, for example pharmaceuticals. Furthermore, the embodiments of the present disclosure are concerned with system for identifying at least one nascent topic related to a subject matter.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of identifying at least one nascent topic related to a subject matter, wherein the method comprises:
a) receiving a request from a user, wherein the request is associated with a context related to the subject matter;
b) analyzing the request to determine at least one topic related to the context;
c) determining an activity factor related to each of the context and the at least one topic from at least one data record related to each of the context and the at least one topic;
d) normalizing the activity factor related to each of the at least one topic based on the activity factor related to the context to obtain a normalized score for each of the at least one topic;
e) analyzing the normalized scores of each of the at least one topic to determine a short-term average and a long-term average normalized score for each of the at least one topic;
f) calculating a difference between the short-term average normalized score and the long-term average normalized score for each of the at least one topic;
g) determining a change in the differences for each of the at least one topic, over a specific time period; and
h) identifying the at least one topic associated with a sustained increase in the difference over a predefined time duration within the specific time period as the at least one nascent topic related to the subject matter.

In another aspect, an embodiment of the present disclosure provides a system for identifying at least one nascent topic related to a subject matter, wherein the system comprises:
a processing module operable to:
receive a request from a user, wherein the request is associated with a context related to the subject matter;

analyze the request to determine at least one topic related to the context;

determine an activity factor related to each of the context and the at least one topic from at least one data record related to each of the context and the at least one topic;

normalize the activity factor related to each of the at least one topic based on the activity factor related to the context to obtain a normalized score for each of the at least one topic;

analyze the normalized score of each of the at least one topic to determine a short-term average and a long-term average normalized score for each of the at least one topic;

calculate a difference between the short-term average normalized score and the long-term average normalized score for each of the at least one topic;

determine a change in the differences for each of the at least one topic, over a specific time period; and identify the at least one topic associated with a sustained increase in the difference over a predefined time duration within the specific time period as the at least one nascent topic related to the subject matter; and a database arrangement communicably coupled to the processing module, wherein the database arrangement is operable to store the identified at least one nascent topic.

The present disclosure provides the method and the system for identifying at least one nascent topic related to a subject matter. The system for identifying at least one nascent topic related to a subject matter is an automated system that is capable of reducing human intervention for determining nascent topics. The system is easy to implement and utilize. The method enables effective and reliable identification at least one nascent topic related to a subject matter. The method is capable of predicting trends topics without compromising with the accuracy of the results. The method is operable to determine between topics that are of has a long-term relevance and a short-term relevance, thereby enabling a user to spot topics for various undertakings, such as, investment, research, innovation and the likes. Additionally, the method is operable to categorise and contextually arrange the nascent topic related to subject matters in the database arrangement.

According to the present invention, the system for identifying at least one nascent topic related to a subject matter relates to an arrangement of modules and/or units that include programmable and/or non-programmable components. The programmable and/or non-programmable components are configured to identify, extract and provide a set of data that describes the at least one nascent topic (described in details herein later). Throughout the present disclosure, the term "subject matter" as used herein, refers to a specific field and/or domain that are used to categorize a concept. The subject matter can be any defined area and/or section that are of user's interest. For example, the specific field and/or domain may be computers, biotechnology, life science, medical science, pharmaceuticals and the like. Furthermore, the subject matter can include one or more topics. The term "topic" relates to a class and or a group within the subject matter that relates to a specific category of detail. For example, a topic may be a qualitative estimation of kidney functionality, namely, Glomerular Filtration Rate, in the subject matter "medical science". Additionally, the nascent topic refers to the class and/or group within the subject matter that has a growing relevance in the subject matter. For example, the nascent topic may be a drug, namely, Opdivo®, in the subject matter "pharmaceuticals". In such example, the drug, namely, Opdivo® may be topic that is a recent innovation in pharmaceuticals for cancer treatment. In such example, the drug, Opdivo® may have been started to be mentioned in various online forums related to pharmaceuticals for cancer treatment. In such example, the drug Opdivo® may be mentioned in every two out of three online forums discussing pharmaceuticals for cancer treatment for past eighteen months.

The system includes a processing module that is operable to identify the at least one nascent topic related to the subject matter. Throughout the present disclosure, the term "processing module" used herein relates to a computational element that is operable to process and respond to instructions for extracting information related to the product. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term processing module refers to one or more individual processors, processing devices and various elements associated with a processing device that may be shared by other processing devices. Additionally, the one or more individual processors, processing devices, and elements are arranged in various architectures for responding to and processing the instructions that drive the system. The processing module is configured to execute a set of steps and/or method to acquire process and identify the topics related to the subject matter that has an ascending growth in relevance, i.e., the topics are being increasing mentioned with reference to the subject matter.

The processing module is operable to receive a request from a user, wherein the request is associated with a context related to the subject matter. The user relates to any entity including a person (i.e., human being) or a virtual personal assistant (an autonomous program or a bot) using the system described herein to spot the at least one nascent topic. The request from the user is an input that is provided to the system for performing a specific function (such as identifying the at least one nascent topic related to the subject matter). The request generated by the user is capable of indicating a subject matter. For example, the request generated may be a snippet of text that indicates changes in a subject matter, such as "the latest developments in pharmaceuticals related to lung cancer". The request received by the processing module can be an input for the system described herein. The request received from the user is associated with the context related to the subject matter. Throughout the present disclosure, the term "context" used herein relates to a subfield and/or sub-domain within the subject matter that can include one or more topics. The context related to the subject matter is a category of similar topics. For example, the subject matter "Oncology" may include concepts such "brain cancer", "lung cancer", "skin cancer" and the likes. In such example, the concept "lung cancer" of the subject matter "Oncology" may include one or more topics such as "surgery", "radiation", "chemotherapy", "immunotherapy", "palliative care" and the likes.

Optionally, the request comprises a user-input from the user. The user-input refers to an inquiry provided by the user to identify topic (i.e., the at least one nascent topic) related to a subject matter. For example, user-input may be a search string provided by the user, such as "what are the latest developments in Glomerular Filtration Rates". In such example, the search string is an inquiry relates to a topic, namely Glomerular Filtration Rate, of the subject matter, namely medical science. Optionally, user input can be provided by any combination of keystrokes, relative and absolute mouse movements, relative and absolute cursor movements, voice commands, the opening and closing of other software programs, or any other activities a computer is capable of carrying out upon input by a user. Optionally, the request comprises a historical data related to web-interaction of the user. Optionally, the term "historical data" as used herein relates to a periodically stored data associated with the web interactions performed by the user using a device for accessing the system as described herein. It will be appreciated that the web interactions are an activity of the user of accessing one or more websites, web locations and the likes, to access information related to a topic. The historical data is an output data that describes the web interactions of the one or more users in an organized and structured manner. In an example, the user may search for information related to "medicines of lung cancer" for a plurality of times using the device. Therefore, historical recorded data may describe that the user may have a requirement of information related to lung cancer pharmaceuticals. In such example, the lung cancer requirement of information related to lung cancer pharmaceuticals can be used as a request to be provided to the processing module. Optionally, the historical recorded data is the periodically saved data related to the information and service accessed by the one or more users using one or more devices for accessing the system as described herein.

The processing module is operable to analyze the request to determine at least one topic related to the context. The processing module is configured to implement one or more methods for analysing the request. Optionally, the one or more methods can include one or more algorithms for analysing the request. The one or more algorithms are configured to implement text mining, machine translation, automatic text summarization, sentiment analysis, topic extraction, named entity recognition, parts-of-speech tagging, relationship extraction, stemming and the likes, to analyze the request. Furthermore, the one or more algorithms may be operable to acquire structure data from the request that can be used as an input for the system. Optionally, the one or more algorithm used to analyze the request can be artificial intelligence algorithms. Optionally, the one or more algorithm used to analyse the request is a natural language processing algorithm. Furthermore, the natural language processing algorithm is operable to identify the context related to the subject matter. Optionally, the processing module is operable to access a data repository to determine at least one topic related to the context. It will be appreciated that the data repository is an ontology database related to the subject matter. Therefore, the data repository can include topics (namely, information, ideas, data, semantic associations and so forth) in a context (namely, subject area, domain and so forth) that details types and properties of the set of concepts and semantic association thereof. Additionally, the data repository can provide information on how a certain topic in a certain context can be associated with one or more topics in multiple subject matters. Optionally, the processing module is further operable to classify each of the at least one topic into at least one concept class. The processing module determines the category of the at least one topic. For example, the at least one topic may be Carcinoembryonic antigen (CEA). In such example, the processing module may identity that the at least one topic, namely CEA, is associated with at least one concept class, namely, cancer biomarker.

Optionally, the processing module is operable to acquire web-content related to the subject matter from existing data sources, wherein the web-content comprises at least one data record related to the at least one topic. Throughout the present disclosure, the term "existing data source" relates to an accessible resource that includes information related to the subject matter. Optionally, the existing data sources can be server arrangement hosting a web site, a web page, or other item of interest accessible on the web adapted to serve web-content (described in details herein later) using any internetworking protocols, and is not intended to be limited to content uploaded or downloaded via the Internet or the Hyper Text Transfer Protocol (HTTP). Optionally, the existing data sources can be a proprietary data repository (such as ontology database) that is operable to store information related to the subject matter. Throughout the present disclosure, the term "web-content" relates to content accessible over the web, or over other portions of the Internet. The web-content is the content that is accessed from the existing data sources, namely, the web site, a web page and the likes accessed by the processing module. For example, the web-content may be a drug for treating lung cancer that is described in a website of a pharmaceutical company producing the drug. Furthermore, the web-content broadly refers to one or more documents, files, scripts, codes, executable programs, web pages or any other digital data that can be transmitted via a network (such as the Internet). Optionally, the web-content can be accessed by the programmable and/or non-programmable components of the system whilst browsing the web. Optionally, the web-content is associated with the at least one data source can include various web-based contents, such as HTML content. The web-content comprises at least one data record associated with the at least one topic. The at least one data record related to the at least one topic refers to the inclusion of information related to the at least one topic. For example, the at least one data record can be a document that is accessed from a website related to subject matter, namely medical science. In such example, the at least one data record (document) will include information, namely Glomerular Filtration Rates, that is related to the at least one topic, namely lung cancer.

Optionally, the processing module comprises a crawler that is operable to crawl the existing data sources for acquiring the web-content. Optionally, the processing module includes the executable programs configured to perform a specific task, such as extracting web-content form the existing data sources, namely a web resource (for example, website, webpage and the likes). Optionally, the executable programs preferably refer to a computer program that is configured to automate a computing task that would otherwise be performed manually. In an example, the executable program is a bot (or spider) that is configured to autonomously browse the web to extract web-content. Optionally, the web crawling is performed in a manner wherein the processing module is configured to execute the executable programs using one or more individual processors, processing devices and units. Furthermore, the one or more individual processors, processing devices and units are arranged in various architectures. Moreover, the one or more individual processors, processing devices and units are configured to process and respond to instructions included in the executable programs to perform web crawling.

Optionally, the crawler is implemented in a distributed architecture. In the event wherein the web crawling module is implemented in the distributed architecture, the programs (such as the bots and/or spiders) for browsing the web are configured to be hosted on one or more computing hardware that is spatially separated from each other. Optionally, crawling the existing data sources includes acquiring the web-content associated with the existing data source. In an example, the web-content acquired by crawling the existing data sources such as a website may include text, web forms, hyperlinks, metadata of the website, and likes. The web-content crawled from the existing data sources are aggregated and provided to the processing module. Optionally, aggregating the web-content included organizing the extracted web-content.

Optionally, the processing module is configured to utilize an application, such as an online crawling tool to acquire the total number of references for the context. For example, the online crawling tool may be configured to crawl the existing data sources such as websites, webpages, and the likes to, related to a context, namely lung cancer.

The processing module is operable to determine activity factor related to the at least one topic from the at least one data record related to the at least one topic. The processing module is operable employ one or more methods and algorithms to determine the at least one data record that mention the at least one topic. Therefore, the activity factor related to the at least one topic is the number of data record that mention the at least one topic for one or more times. For example, the at least one topic may be Glomerular Filtration Rates for determining the effect of lung cancer and the at least one data record may be web-document wherein the mentions the at least one topic Glomerular Filtration Rates in relation to lung cancer. In such instance, the one or more methods and/or algorithms of the processing module is configured to identify that the activity factor related to the Glomerular Filtration Rates for determining the effect of lung cancer as one. In another example, the at least one topic may be Glomerular Filtration Rates for determining the effect of lung cancer, and more than one data record, such as web-document, has mentioned the at least one topic Glomerular Filtration Rates in relation to lung cancer. In such instance, the activity factor related to the Glomerular Filtration Rates for determining the effect of lung cancer is more than one.

The method for identifying at least one nascent topic comprises normalizing the activity factor related to each of the at least one topic based on the activity factor related to the context to obtain a normalized score for each of the at least one topic. The processing module is operable to normalize the activity factor related to each of the at least one topic based on the activity factor related to the context to obtain a normalized score for each of the at least one topic. Specifically, the processing module is operable to acquire the activity factor for the context. More specifically, the total number of data records published for the context are determined. Subsequently, the determined activity factor for each of the at least one topic is obtained. Consequently, the normalised score for each of the at least one topic is obtained by dividing the determined activity factor of the at least topic with the activity factor of the context related to the subject matter. It is to be understood that activity factor related to each of the context and the at least one topic is determined for a given time period (for example, one month). Therefore, the activity factor of the at least one topic is normalised to obtain the normalised score thereof for such given time period. Furthermore, normalised score for each of the at least one topic for the given time period continuously to obtain a plurality of normalised scores. In an example, activity factor related to each of the context and the at least one topic may be determined for one month. Consequently, normalised score for the at least one topic may be obtained for the one month. Furthermore, in the example, the activity factor related to each of the context and the at least one topic may be analysed over a year. Therefore, normalising the activity factors for a year may yield twelve normalised scores for the at least one topic.

The method comprises analyzing the normalized score of each of the at least one topic to determine a short-term average and a long-term average normalized score for each of the at least one topic. Furthermore, the processing module is operable to analyze the normalized score to determine the short-term average normalized score and long-term average normalized score. Specifically, normalized scores are determined for a given period of time (for example, a month) continuously to obtain a plurality of normalized scores (for example, 12 normalized scores for a year). Therefore, a short-term average normalized score is calculated by analyzing normalized scores for the given period of time over a short-term period (for example, two months). Furthermore, a long-term average normalized score is calculated by analyzing normalized scores for the given period of time over a long-term period (for example, a year).

In an example, normalized score for a topic "Gene 133" may be calculated for one month each over a period of one year starting from "January 2017" up to "December 2017". Therefore, for the topic, the processing module comprise 12 normalized score for each of the month in the year 2017. In the example, the short-term period is designated as two months. Similarly, in the example, the long-term period is designated as six months. Therefore, for determining a short-term average normalized score for the month "February 2017", the normalized scores of the months "January 2017" and "February 2017" are averaged. Similarly, for determining a short-term average normalized score for the month "August 2017", the normalized scores of the months "July 2017" and "August 2017" are averaged. Furthermore, for determining a long-term average normalized score for the month "August 2017", the normalized scores of the months "March 2017", "April 2017", "May 2017", "June 2017", "July 2017" and "August 2017" are averaged.

The method further comprises calculating a difference between the short-term average normalized score and the long-term average normalized score for each of the at least one topic. Furthermore, the processing module is operable to calculate the difference between the short-term average normalized score and the long-term average normalized score for each of the at least one topic. Specifically, the difference is calculated for the given period of time. In the aforementioned example relating to the topic "Gene 133", difference between short term average normalized score and long-term average normalized score for a month is calculated by subtracting the long terms average normalized score from the short-term average normalized score for that month. In an instance, difference between short term average normalized score and long-term average normalized score for the "January 2017" calculated by subtracting the long terms average normalized score from the short-term average normalized score of "January 2017".

The method further comprises determining a change in the differences for each of the at least one topic, over a specific time period. Moreover, the processing module is operable to determine a change in the differences for each of the at least one topic. Specifically, the processing module is operable to determine an increase or decrease in the value of difference of each of the given time period (for example, a month) over the specific time period (for example, a year). In an instance, the change in differences of each of a month in a year is determined. It will be appreciated that an increase in the difference between the short-term average normalized score and the long-term average normalized score of a given topic signifies an increased overall interest of the given topic.

The method further comprises identifying the at least one topic associated with a sustained increase in the difference over a predefined time duration within the specific time period as the at least one nascent topic related to the subject matter. Specifically, the change in differences over a specific time period (for example, a year) for each of the at least one topic is analyzed. Consequently, at least one topic with a sustained increase in the difference for a predefined time duration (for example, ten months) over the specific time period (for example, a year) is determined as the at least one nascent topic. It will be appreciated that a topic gaining interest in a subject matter may not show an increase in the entirety of the specific time period. Therefore, a sustained increase in the interest of the topic may have to be identified by discounting a few inconsistencies in the change in difference. In an example, a topic may exhibit an increase in difference for ten months for an analyzed change in differences for a year. Therefore, the topic is identified as a nascent topic. However, a topic may exhibit an increase in difference for six months for an analyzed change in differences for a year. Therefore, such topic may not be identified as a nascent topic as it does not exhibit a sustained increase in difference over a predefined time duration of ten months in the specific period of time of a year.

Optionally, the method further comprises determining a smoothening factor, based on the differences for each of the at least one topic, for a particular time span. Specifically, the differences determined for a given period of time (for example, a month) over the specific time period (for example, a year) when plotted over a graph may exhibit random crests and troughs and may not provide a definite estimate for the at least one topic. Therefore, a smoothening factor may be determined for a given period of time (for example, a month) over the specific time period (for example, a year) to obtain a plurality of smoothening factors (for example, twelve smoothening factors). Consequently, such plurality of smoothening factors may exhibit a consistent trend of increase or decrease for at least one topic. Subsequently, a sustained increase in the smoothening factor for a predefined time duration over the specific time period may assist in the identification of at least one nascent topic. Moreover, a smoothening factor may be calculated for a given period of time (for example, a month) by calculating an average of the differences over another period of time (for example, eight months). In an example, for calculating a smoothening factor a month of "September 2016" over eight months, the differences for the months "February 2016", "March 2016", "April 2016", "May 2016", "June 2016", "July 2016", "August 2016" and "September 2016" are averaged.

Optionally, the predefined time duration associated with change in the difference for at least one nascent topic is twenty months duration, within the specific time period of twenty fourth months. Such predefined time duration corresponds to twenty months in the specific time period of twenty-four months. The processing module is operable to determine the change in the difference of at least one topic in the twenty months duration. Subsequently, when the change is associated with the sustained increase in the difference within the twenty months duration, the at least one topic is identified as the at least one nascent topic. In one example, the specific time period of twenty-four months is a period from "January 2015" to "December 2017", and the at least one topic comprises a topic "Glomerular Filtration Test". In such an example, the processing module is operable to determine the change in the difference for "Glomerular Filtration Test" between "May 2015" and "December 2017". Furthermore, when the topic "Glomerular Filtration Test" is associated with an increase in the difference between "May 2015" and "December 2017", the topic is identified as the at least one nascent topic within the specific time period of twenty-four months from "January 2015" to "December 2017". Furthermore, the predefined duration of time (for example, twenty months) can be a continuous duration of months and/or a collection of discrete months within the specific time period of twenty-month time period. Such a collection of the discrete months may be a set of consecutive or non-consecutive months, for example, a first and last ten months of the specific duration of twenty-four months.

Optionally, the predefined time duration associated with change in the difference for the at least one nascent topic is user-defined duration, within the specific period of time. The processing module may be operable to receive a user-input of the predefined time duration from a user. The user-input will be associated with a portion of the specific period of time, such as one year, six months, two months and so forth, of the specific period of time. Moreover, the processing module is operable to consider the portion of the specific period of time as the predefined time duration, wherein the predefined time duration is considered towards an end of the specific period of time. Subsequently, the processing module is operable to determine the increase in the difference for the at least one topic within the predefined time duration. In an example, the at least one topic is "Glomerular Filtration Rates" and the specific time period is a period of 24 months starting "June 1982" to "July 1984". Furthermore, a user provides a user-input of six months as the predefined time duration. In such an example, the processing module is operable to determine the increase in the difference for the topic "Glomerular Filtration Rates" from "January 1984" to "July 1984". Subsequently, upon determining an increase in the difference for the topic "Glomerular Filtration Rates" between "January 1984" and "July 1984", the topic is identified as the at least one nascent topic. Such a user-input may be received, for example, as a text-input, using a user-interface, using a GUI and so forth.

Optionally, the predefined time duration associated with change in the difference for the at least one nascent topic is determined in an iterative manner. For example, the processing module may be operable to receive a user-defined threshold associated with a minimum increase in the difference for the at least one topic. Subsequently, the processing module is operable to optimize predefined time duration based on the minimum increase in the difference. Furthermore, the processing module is operable to determine the predefined time duration based on the difference for the at least one topic being equal to, or more than the minimum increase in the difference, in an iterative manner, within the specific time period. Moreover, as discussed hereinbefore, the predefined time duration may be the period of 20 months when the specific time period is 24 months, or the predefined time duration may be the user-defined duration. In one example, the specific time period is a period of 24 months starting from "January 2010" and ending at "December 2012". Furthermore, the predefined time duration is a user-defined duration of 6 months and the user-defined threshold associated with the minimum increase in the difference for the at least one nascent topic is 10%. In such an example, the processing module is operable to determine the increase in the difference for the at least one topic comprising topics "Kidney Failure Test", "Kidney Failure Diagnosis" and "Kidney Failure Symptoms". Furthermore, the processing module is operable to determine the change for each of the at least one topic in the predefined time duration from "June 2012" to "December 2012". However, the topics "Kidney Failure Test", "Kidney Failure Diagnosis" and "Kidney Failure Symptoms" are each associated with the increase in the difference of 6%, 7% and 5% respectively within the predefined time duration. In such an example, as the increase in the difference of the topics is less than the user-defined threshold, the processing module is operable to determine the increase for a predefined period from "May 2012" to "December 2012". Subsequently, when the increase in the difference is still less than the user-defined threshold, the processing module is operable to determine the increase for a predefined time period from "April 2012" to "December 2012", "March 2012" to "December 2012" and "February 2012" to "December 2012" respectively. In such an instance, the topic "Kidney Failure Diagnosis" is associated with an increase of 12% in the difference within the predefined time period from "February 2012" to "December 2012". In such an instance, the predefined time duration is determined to be 10 months between "February 2012" and "December 2012" and the topic "Kidney Failure Diagnosis" is identified as the at least one nascent topic within the predefined time duration.

Optionally, the processing module is operable to calculate an absolute change of the normalized score for each of the at least one nascent topic as a difference in the short-term average normalized score and the long-term average normalized score. The absolute change is a numerical value that represents the normalized score for each of the at least one nascent topic. The processing module may include one or more algorithms that is operable to perform one or more mathematical calculations to calculate an absolute change of the normalized score for each of the at least one nascent topic. Furthermore, the one or more algorithms are operable to determine the difference in the short-term average normalized score and the long-term average normalized score. In an example, the one or more algorithms may use the short-term average normalized score and the long-term average normalized score for each of the at least one nascent topic as an input to generate a numerical value that is the absolute change of the normalized score for each of the at least one nascent topic. Furthermore, in the example, the topic may be Glomerular Filtration Rates, the short-term average normalized score for Glomerular Filtration Rates is 10, and the long-term average normalized score for Glomerular Filtration Rates is 7. In such an instance, the one or more algorithms determines the difference between the short-term average normalized score (10) and the long-term average normalized score (7), and defines that the absolute change of the normalized score of Glomerular Filtration Rates as 3.

Optionally, the processing module is operable to calculate a percentage change of the normalized score for each of the at least one nascent topic as a ratio of the absolute change and the long-term average normalized score. The percentage change is a numerical value that represents the normalized score for each of the at least one nascent topic. The processing module may include one or more algorithms that is operable to perform one or more mathematical calculations to calculate a percentage change of the normalized score for each of the at least one nascent topic. Furthermore, the one or more algorithms are operable to determine the ratio of the absolute change and the long-term average normalized score. In an example, the one or more algorithms may use the absolute change and the long-term average normalized score for each of the at least one nascent topic as an input to generate a numerical value that is the percentage change of the normalized score for each of the at least one nascent topic. Furthermore, in the example, the topic may be Glomerular Filtration Rates, the absolute change for Glomerular Filtration Rates may be 5, and the long-term average normalized score for Glomerular Filtration Rates is 10. In such an instance, the one or more algorithms determines the ratio between the absolute change (5) and the long-term average normalized score (10), and defines that the percentage change of the normalized score of Glomerular Filtration Rates as 0.5.

Optionally, the processing module is operable to determine a net score for each of the at least one nascent topic as a sum of the absolute change and the percentage change. The net score is a cumulate numerical value that represents the sum of the absolute change and the percentage change. The processing module may include one or more algorithms that is operable to perform one or more mathematical calculations to calculate a sum of the absolute change and the percentage change for each of the at least one nascent topic. Furthermore, the one or more algorithms are operable to cumulate the absolute change and the percentage change for each of the at least one nascent topic. In an example, the one or more algorithms may use the absolute change and the percentage change for each of the at least one nascent topic as an input to generate a cumulate numerical value for each of the at least one nascent topic. Furthermore, in the example, the topic may be Glomerular Filtration Rates, the absolute change for Glomerular Filtration Rates may be 5, and the percentage change for Glomerular Filtration Rates is 3. In such an instance, the one or more algorithms is implemented on one or more mathematical calculations to cumulate the absolute change (5) and the percentage change (3), and defines that the net score for Glomerular Filtration Rates as 8.

Optionally, the processing module is operable to assign a rank to each of the at least one nascent topic based on the net score. The rank to each of the at least one nascent topic refers to a number rank, where a lower number corresponds to a higher or better rank. Furthermore, the rank of assigned to each of the at least one nascent topic is based on the value of the net score associated with each of the at least one nascent topic (i.e. a higher value of the net score corresponds to a lower number in the rank). In an example, a Glomerular Filtration Rates may be a nascent topic that has a net score of 7, Opdivo® may be another nascent topic that has a net score of 5, and Kidney Function Test may be another nascent topic that has a net score of 3. In such instance the Glomerular Filtration Rates may be ranked 1, Opdivo® may be ranked 2, and Kidney Function Test may be ranked 3.

Optionally, the processing module is operable to generate a list associated with the ranks of the at least one nascent topic. Specifically, the processing module is operable to catalogue the each of the at least one nascent topic in a hierarchical manner. Furthermore, arranging the nascent topics in the hierarchical manner refers to positioning at least one nascent topic that comprising a higher number rank at that top, and positioning the successive nascent topics in a descending order of number rank. In an example, Glomerular Filtration Rates may be nascent topic comprising a number rank of 1, Opdivo® may be nascent topic comprising a number rank of 2, and Kidney Function Test may be nascent topic comprising a number rank of 3. In such instance, the processing module is operable to generate a list that catalogues Glomerular Filtration Rates at the top followed by Opdivo®, and Kidney Function Test after Opdivo®.

The system includes database arrangement communicably coupled to the processing module. Throughout the present disclosure, the term "database arrangement" as used herein, relates to an organized body of digital information regardless of a manner in which the data or the organized body thereof is represented. Optionally, the database arrangement may be hardware, software, firmware and/or any combination thereof. For example, the organized body of digital information may be in the form of a table, a map, a grid, a packet, a datagram, a file, a document, a list or in any other form. The database arrangement includes any data storage software and systems, such as, for example, a relational database like IBM DB2 and Oracle 9. Furthermore, the database arrangement includes a software program for creating and managing one or more databases. Optionally, the database arrangement may be operable to support relational operations, regardless of whether it enforces strict adherence to a relational model, as understood by those of ordinary skill in the art. Additionally, the database arrangement is populated by the topic-based web content. Optionally, and the database arrangement is populated by the operational data associated with the topic-based web content. The database arrangement is operable to store the at least one topic. The processing module is configured to provide the database arrangement with the identified at least one nascent topic. Optionally, the processing module is operable to provide the database with the list of the at least one nascent topic associated with highest ranks to stored therein.

Furthermore, there is disclosed a computer readable medium, containing program instructions for execution on a computer system, which when executed by a computer, cause the computer to perform method steps for identifying at least one nascent topic related to a subject matter. The method comprising the steps of receiving a request from a user, wherein the request is associated with a context related to the subject matter; analyzing the request to determine at least one topic related to the context; determining an activity factor related to each of the context and the at least one topic from at least one data record related to each of the context and the at least one topic; normalizing the activity factor related to each of the at least one topic based on the activity factor related to the context to obtain a normalized score for each of the at least one topic; analyzing the normalized score of each of the at least one topic to determine a short-term average and a long-term average normalized score for each of the at least one topic; calculating a difference between the short-term average normalized score and the long-term average normalized score for each of the at least one topic; determining a change in the difference for each of the at least one topic, over a specific time period; and identifying the at least one topic associated with a sustained increase in the difference over a predefined time duration within the specific time period as the at least one nascent topic related to the subject matter.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Referring to FIG. 1, illustrated are steps of a method of identifying at least one nascent topic related to a subject matter, in accordance with an embodiment of the present disclosure. At a step 102, a request from a user is received, wherein the request is associated with a context related to the subject matter. At a step 104, the request to determine at least one topic related to the context is analyzed. At a step 106, an activity factor related to each of the context and the at least one topic is determined from at least one data record related to each of the context and the at least one topic. At a step 108, the activity factor related to each of the at least one topic based on the activity factor related to the context is normalized to obtain a normalized score for each of the at least one topic. At a step 110, the normalized scores of each of the at least one topic is analyzed to determine a short-term average and a long-term average normalized score for each of the at least one topic. At a step 112, a difference between the short-term average normalized score and the long-term average normalized score for each of the at least one topic is calculated. At a step 114, a change in the differences for each of the at least one topic, is determined over a specific time period. At a step 116, the at least one topic associated with a sustained increase in the difference over a predefined time duration within the specific time period is identified as the at least one nascent topic related to the subject matter.

Figure 2:
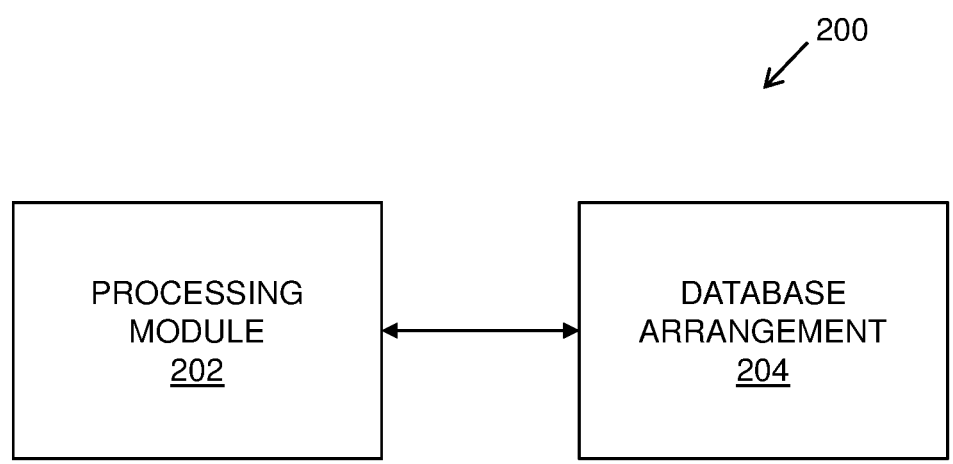
FIG. 2 is a block diagram of a system for identifying at least one nascent topic related to a subject matter, in accordance with an embodiment of the present disclosure.

Referring to FIG. 2, illustrated is a block diagram of a system 200 for identifying at least one nascent topic related to a subject matter, in accordance with an embodiment of the present disclosure. The system 200 comprises a processing module 202 operable to receive a request from a user as input and identify at least one nascent topic related to a subject matter as output. As shown the system 200 includes a processing module 202, and database arrangement 204. Optionally, the processing module 202 is operable to acquire web-content related to the subject matter from existing data sources. The database arrangement 204 is communicably coupled to the processing module 202. Furthermore, the processing module 202 is configured to store the identified at least one nascent topic in the database arrangement 204.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of identifying one or more nascent topic related to a subject matter, wherein the method comprises:
   a) receiving a request from a user, wherein the request is associated with a context related to the subject matter;
   b) analyzing the request to determine one or more topic related to the context;
   c) determining an activity factor related to the context and the one or more topic, wherein the activity factor of the context is total number of data records published for the context and wherein the activity factor of the one or more topic is number of data records that mention the one or more topic for one or more times;
   d) obtaining a normalized score for each of the one or more topic, wherein the normalized score for each of the one or more topic is obtained by dividing the determined activity factor of the one or more topic with the activity factor of the context related to the subject matter;

e) analyzing the normalized scores of each of the one or more topic to determine a short-term average and a long-term average normalized score for each of the one or more topic;
f) calculating a difference between the short-term average normalized score and the long-term average normalized score for each of the one or more topic;
g) determining a change in the differences for each of the one or more topic, over a specific time period; and
h) identifying the one or more topic associated with a sustained increase in the difference over a predefined time duration within the specific time period as the one or more nascent topic related to the subject matter.

2. The method of claim 1, wherein the method further comprises determining a smoothening factor, based on the differences for each of the one or more topic, for a particular time span.

3. The method of claim 1, wherein the request comprises one or more of: a user input from the user, and/or historical data related to web-interaction of the user.

4. The method of claim 1, wherein the method further comprises acquiring web content related to the subject matter from existing data sources, wherein the web content comprises one or more data record related to the one or more topic.

5. The method of claim 1, wherein the method further comprises:
calculating an absolute change of the normalized score for each of the one or more nascent topic as a difference in the short-term average normalized score and the long-term average normalized score;
calculating a percentage change of the normalized score for each of the one or more nascent topic as a ratio of the absolute change and the long-term average normalized score;
determining a net score for each of the one or more nascent topic as a sum of the absolute change and the percentage change; and
assigning a rank to each of the one or more nascent topic based on the net score.

6. The method of claim 5, wherein the method further comprises generating a list associated with the ranks of the one or more nascent topic.

7. The method of claim 1, wherein the predefined time duration associated with change in the difference for a one or more nascent topic is twenty months duration, within the specific time period of twenty-four months.

8. The method of claim 1, wherein the predefined time duration associated with change in the difference for one or more nascent topic is user-defined duration, within the specific period of time.

9. The method of claim 1, wherein the predefined time duration associated with change in the difference for one or more nascent topic is determined in an iterative manner.

10. The method of claim 1, wherein analyzing the request at (b) further comprises classifying each of the one or more topic into at least one concept class.

11. The method of claim 4, wherein acquiring the web-content comprises crawling the existing data sources.

12. A system for identifying one or more nascent topic related to a subject matter, wherein the system comprises:
a processor configured to:
receive a request from a user, wherein the request is associated with a context related to the subject matter;
analyze the request to determine one or more topic related to the context;
determine an activity factor related to the context and the one or more topic, wherein the activity factor of the context is total number of data records published for the context and wherein the activity factor of the one or more topic is number of data records that mention the one or more topic for one or more times;
obtaining a normalized score for each of the one or more topic, wherein the normalized score for each of the one or more topic is obtained by dividing activity factor of the one or more topic with the activity factor of the context related to the subject matter;
analyze the normalized score of each of the one or more topic to determine a short-term average and a long-term average normalized score for each of the one or more topic;
calculate a difference between the short-term average normalized score and the long-term average normalized score for each of the one or more topic;
determine a change in the differences for each of the one or more topic, over a specific time period; and
identify the one or more topic associated with sustained increase in the difference over a predefined time duration within the specific time period as the one or more nascent topic related to the subject matter; and
a database arrangement communicably coupled to the processor, wherein the database arrangement is configured store the identified one or more nascent topic.

13. The system of claim 12, wherein the processor is further configured to determine a smoothening factor, based on the differences for each of the one or more topic, for a particular time span.

14. The system of claim 12, wherein the processor is further configured to acquire web-content related to the subject matter from existing data sources, wherein the web-content comprises one or more data record related to the one or more topic.

15. The system of claim 14, wherein the processor comprises a crawler that is configured to crawl the existing data sources for acquiring the web-content.

16. The system of claim 12, wherein the request comprises one or more of: a user-input from the user, and/or historical data related to web-interaction of the user.

17. The system of claim 12, wherein the processor is further configured to:
calculate an absolute change of the normalized score for each of the one or more nascent topic as a difference in the short-term average normalized score and the long-term average normalized score;
calculate a percentage change of the normalized score for each of the one or more nascent topic as a ratio of the absolute change and the long-term average normalized score;
determine a net score for each of the one or more nascent topic as a sum of the absolute change and the percentage change; and
assign a rank to each of the one or more nascent topic based on the net score.

18. The system of claim 17, wherein the processor is further configured to generate a list associated with the ranks of the one or more nascent topic.

19. The system of claim 13, wherein the processor is further configured to identify an increase or a decrease in the activity factor for each of the one or more topic within the specific time period.

20. A non-transitory computer readable storage medium, containing program instructions for execution on a computer system, which when executed by a computer, cause the computer to perform method steps for identifying one or more nascent topic related to a subject matter, the method comprising the steps of:

a) receiving a request from a user, wherein the request is associated with a context related to the subject matter;

b) analyzing the request to determine one or more topic related to the context;

c) determining an activity factor related to the context and the one or more topic, wherein the activity factor of the context is total number of data records published for the context and wherein the activity factor of the one or more topic is number of data records that mention the one or more topic for one or more times;

d) obtaining a normalized score for each of the one or more topic, wherein the normalized score for each of the one or more topic is obtained by dividing the determined activity factor of the one or more topic with the activity factor of the context related to the subject matter;

e) analyzing the normalized score of each of the one or more topic to determine a short-term average and a long-term average normalized score for each of the one more topic;

f) calculating a difference between the short-term average normalized score and the long-term average normalized score for each of the one or more topic;

g) determining a change in the difference for each of the one or more topic, over a specific time period; and h) identifying the one or more topic associated with a sustained increase in the difference over a predefined time duration within the specific time period as the one or more nascent topic related to the subject matter.

* * * * *